United States Patent
Jeon

(10) Patent No.: US 7,095,950 B2
(45) Date of Patent: Aug. 22, 2006

(54) APPARATUS AND METHOD FOR PROCESSING VIDEO-ID SIGNAL

(75) Inventor: Jong-gu Jeon, Suwon (KR)

(73) Assignee: Samsung Electronics Co., Ltd. (KR)

( * ) Notice: Subject to any disclaimer, the term of this patent is extended or adjusted under 35 U.S.C. 154(b) by 1224 days.

(21) Appl. No.: 09/808,033

(22) Filed: Mar. 15, 2001

(65) Prior Publication Data

US 2002/0018642 A1  Feb. 14, 2002

(30) Foreign Application Priority Data

Jul. 7, 2000 (KR) .................................. 2000-38836

(51) Int. Cl.
- H04N 5/91 (2006.01)
- H04N 7/00 (2006.01)
- H04N 7/26 (2006.01)

(52) U.S. Cl. .................... 386/69; 386/46; 386/109

(58) Field of Classification Search .............. 386/69, 386/109, 111, 112, 27, 33, 46, 45, 125, 124, 386/126, 40, 79, 81, 82, 68, 6, 70; H04N 5/91, H04N 7/00, 7/26

See application file for complete search history.

(56) References Cited

U.S. PATENT DOCUMENTS

| | | | | |
|---|---|---|---|---|
| 5,303,091 A | * | 4/1994 | Sakurai | ....................... 386/104 |
| 5,666,238 A | * | 9/1997 | Igari et al. | ................ 360/77.08 |
| 5,715,104 A | | 2/1998 | Takada et al. | |
| 5,768,252 A | * | 6/1998 | Yokota | ..................... 369/30.04 |

FOREIGN PATENT DOCUMENTS

| | | |
|---|---|---|
| JP | 5-83632 A | 4/1993 |
| JP | 11-261956 A | 9/1999 |
| JP | 2000-13740 A | 1/2000 |
| JP | 2000-23093 A | 1/2000 |
| JP | 2000-134589 A | 5/2000 |

OTHER PUBLICATIONS

Japanese Abstract No. 05047067, Feb. 26, 1993.

* cited by examiner

*Primary Examiner*—Robert Chevalier
(74) *Attorney, Agent, or Firm*—Sughrue Mion, PLLC

(57) ABSTRACT

An method and apparatus for processing a video-ID signal which detects, records, and reproduces a video-ID signal. The method for processing the video-ID signal includes the steps of detecting the starting position of a video-ID signal from an input video signal, compressing video data started from the video-ID signal as a predetermined compression unit, and recording the starting position of the detected video-ID signal in a predetermined recording area. The method also includes detecting the starting position of the video-ID signal recorded in the predetermined recording area, and decoding a video signal which inserts the video-ID signal into the starting position. Therefore, a video-ID signal is recorded in a time-lapse video recording and reproducing system, and the video-ID signal is identified with a video signal to be compressed and restored, so that compatibility between different systems having different switching portions is maintained.

9 Claims, 8 Drawing Sheets

US 7,095,950 B2

APPARATUS AND METHOD FOR PROCESSING VIDEO-ID SIGNAL

BACKGROUND OF THE INVENTION

1. Field of the Invention

The present invention relates to a video recording and reproducing apparatus, system and method, and more particularly, to an apparatus, system and method for detecting and processing a video-ID signal, and then recording and restoring the video-ID signal together with a video signal.

This application is based upon Korean Patent Application No. 00-38836, which was filed on Jul. 7, 2000, and is incorporated herein by reference.

2. Description of the Related Art

In general, a time-lapse video recording system used for prolonged monitoring, such as monitoring cameras, does not record entire frames in real time among video signals transmitted from an external photographing apparatus, but records one frame at a regular interval, replaying and stopping repeatedly.

An ordinary time-lapse video recording system shown in FIG. 1 comprises a camera 110, a switching portion 130, a monitor 120, and a VCR 140. The switching portion 130 synchronizes each frame of frames input from a plurality of external cameras 110 to be identical, and selectively outputs a video signal reproduced from the VCR 140 to the corresponding monitor 120. Also, the switching portion 130 adds a video-ID signal at a specific signal interval of a synchronous signal, and detects a video-ID signal previously inserted into a video signal reproduced from the VCR 140. The inserted video-ID signal includes various information such as a camera-ID, a frame-ID and time information.

These ordinary time-lapse video recording reproducing systems provide switching portions 130 that have manufacturer-dependent video-ID signal insertion positions. After evaluating the switching portion 130 and ascertaining its corresponding insertion position, a video-ID signal is inserted at a specific signal interval, which does not overlap the corresponding position. It is almost impossible, however, to evaluate every switching portion. If the switching portion is of a specific manufacturer, incorrect operation can occur because of overlapping of insertion positions of a video-ID signal. There is also a lack of system compatibility.

SUMMARY OF THE INVENTION

To solve the above problems, it is an object of the present invention to provide a video-ID signal processing apparatus which records a video-ID signal in a time-lapse video recording reproducing system, and compresses and restores the video-ID signal by identifying the video-ID signal with a video signal.

Accordingly, to achieve the above object, there is provided a video-ID signal processing method in a recording and reproducing system, wherein the method includes detecting a starting position of a video-ID signal from an input video signal, compressing a video data started from the video-ID signal as a predetermined compression unit, and recording the detected starting position in a predetermined recording area. The method also includes detecting the recorded starting position of the video-ID signal, and decoding a video signal that inserts the video-ID signal to the starting position.

To achieve another object, there is provided a video signal recording apparatus in a recording and reproducing system, wherein the apparatus includes an ID position detector for detecting a starting position of a video-ID signal inserted at a predetermined interval of an input video signal, a video processor for compressing a video data started from the detected starting position as a predetermined compressing unit, ad a controller for recording the detected starting position of the video-ID signal in a predetermined recording area of recording media.

To achieve another object, there is provided a video signal reproducing apparatus in a recording and reproducing system, wherein the apparatus includes an ID position detector for detecting a starting position of a video ID signal recorded in a predetermined recording area, and a video processor for decoding a video signal which inserts the video-ID signal to the detected starting position of the video-ID signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
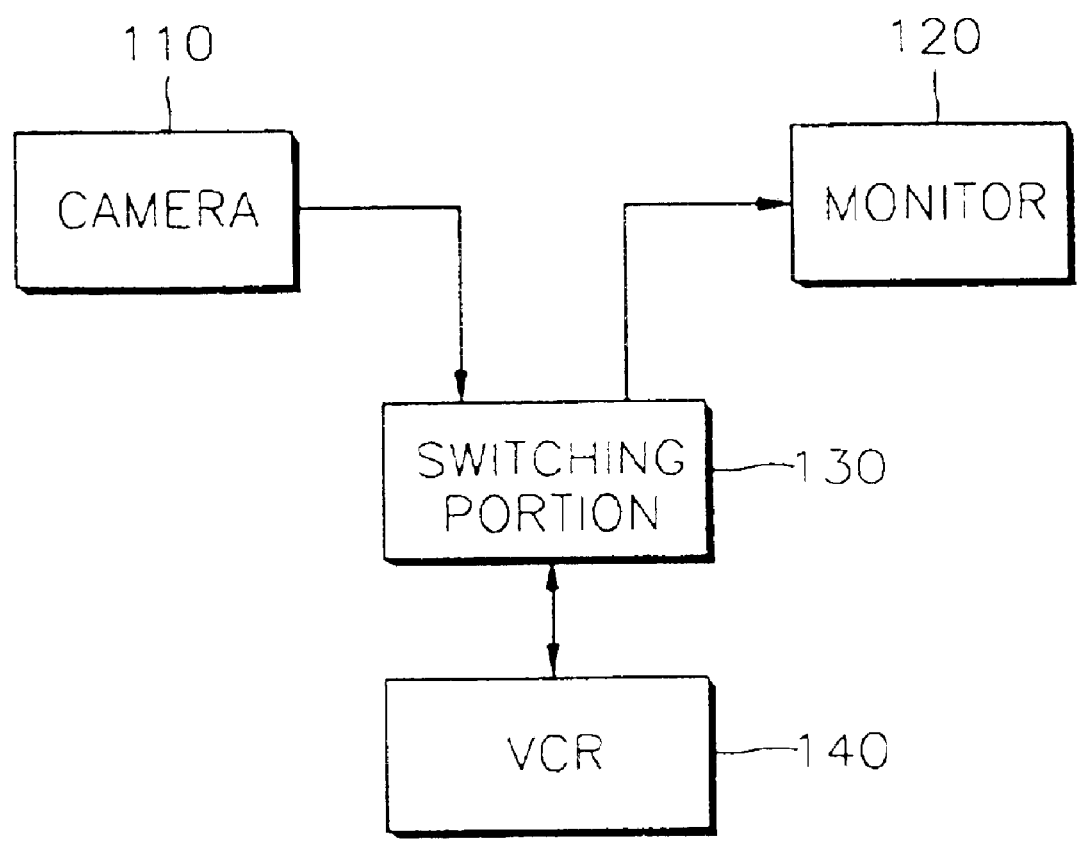
FIG. 1 is a block diagram of an ordinary time-lapse reproducing and recording system.
Figure 2:
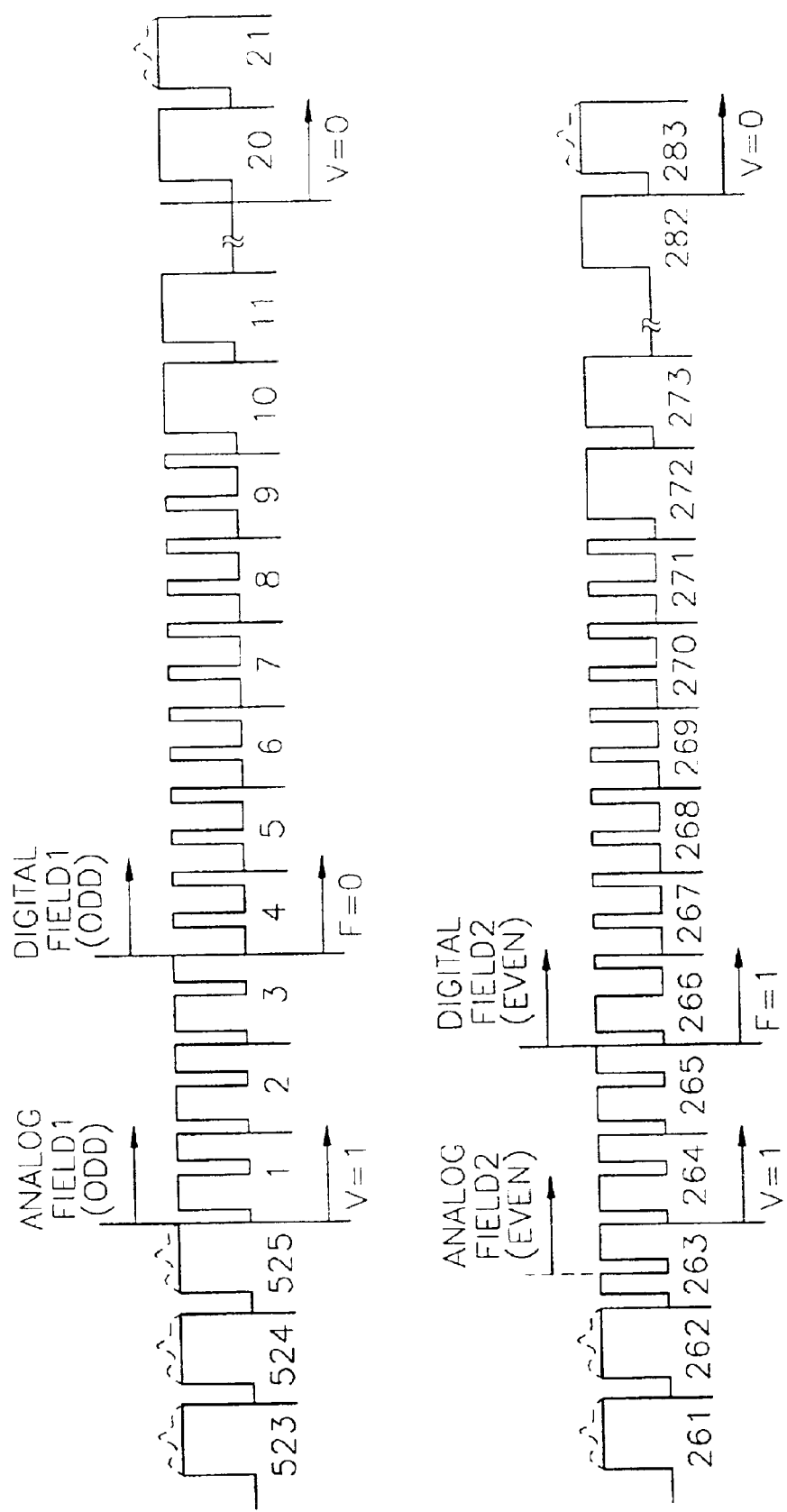
FIG. 2 illustrates the structure of a frame of general video signals.

FIG. 2 is a frame is divided into an odd field (ODD) and an even field (EVEN), which are formed differently from an analog signal (ANALOG) and a digital signal (DIGITAL). For example, one NTCS type frame is formed of 525 horizontal synchronous signals. Here, a video-ID (hereinafter referred to as ID signal) is different according to a switching portion, and has a different starting position at every maker. In general, a starting position of an ID signal starts at 11H, 13H, 17H, and the ending position of an ID signal is not known.

Figure 3:
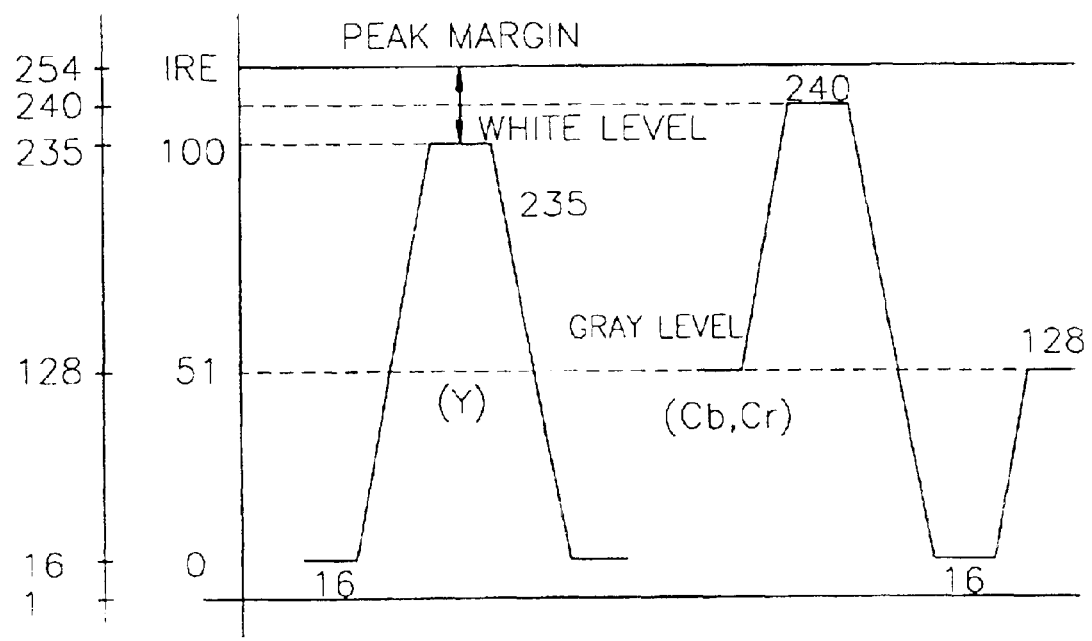
FIG. 3 illustrates a sample level of respective video signals of FIG. 2.

Referring to FIG. 3, a sample level is different according to luminance (Y) and color (Cb or Cr) signals. Here, the ID signal is a low frequency signal existing only in the luminance (Y) signal and repeating High and Low. Therefore, the ID signal is detected with reference to the level of the luminance signal.

Figure 4:
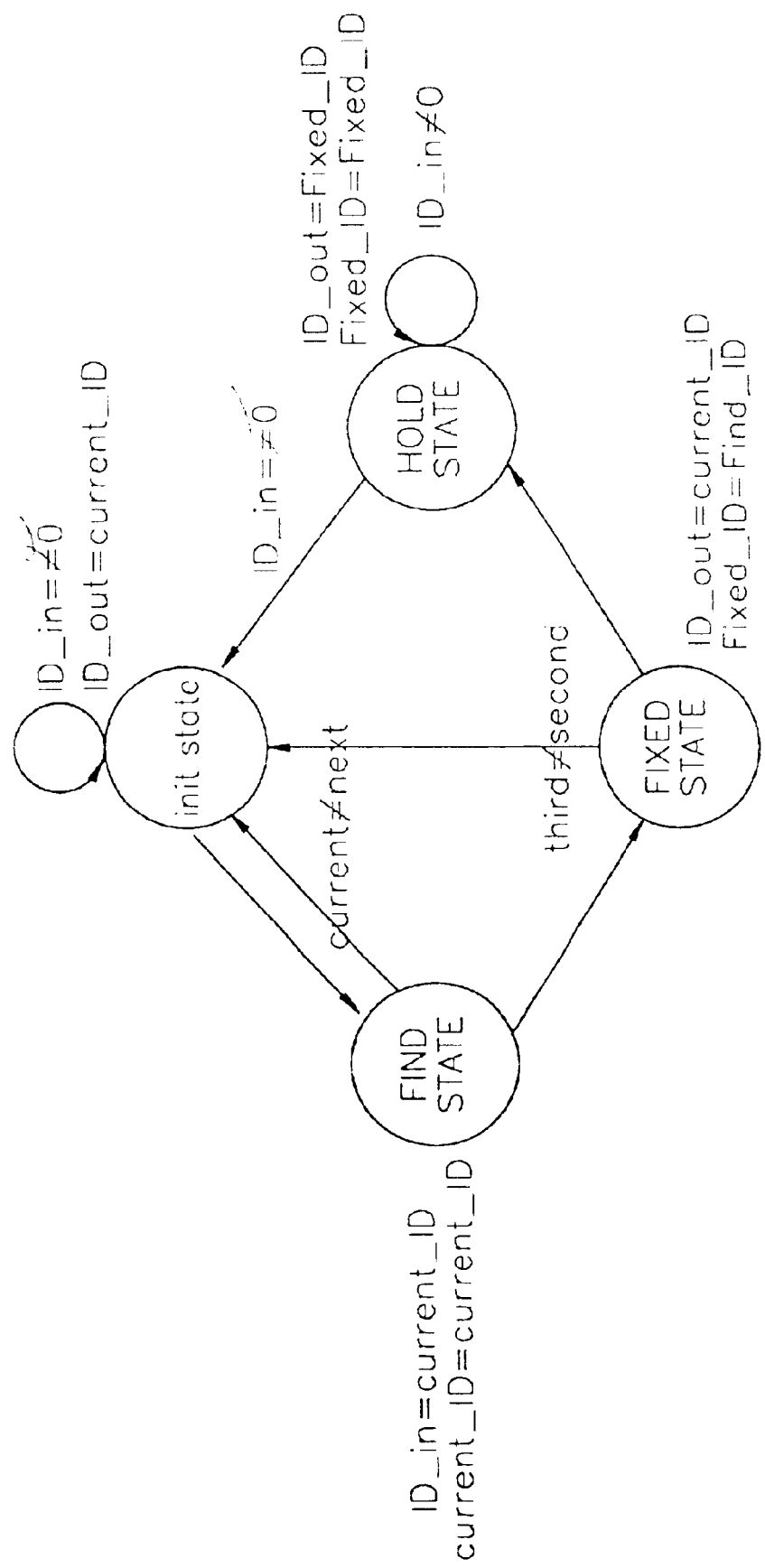
FIG. 4 is a state transition diagram detecting a starting position of an ID signal according to the present invention.

FIG. 4 is a state transition diagram detecting the starting position of the ID signal according to the present invention.

First, if a detection starting signal is received, detection of the starting position of the ID signal begins. Here, if a luminance signal among input video signals is equal to or higher than a certain level, it is determined to be the start of an ID signal.

An Init state is transited to a Find state after the starting position of an ID signal, which will be output in a state in which the starting position of an ID signal is not input (ID_in=0), is determined as the starting position of an ID signal presently stored.

Next, if the starting position of an ID signal of a current frame is received, the ID starting position of a next frame (next) is detected, and then, the Find state compares the ID starting position of a next frame with that of a current frame (current). Here, if the ID starting positions of a current frame (current) and a next frame (next) are not the same, the Find state is transited to an Init state, and if the ID starting positions of two frames are the same, the Find state is transited to a Fixed state.

Next, the Fixed state detects the ID starting position of the third frame (third) and compares it with the ID starting position of the previous position (second). Here, if the ID starting positions of the third and second frames are the same, the Fixed state is transited to the Hold state, and if the ID starting positions are not the same, the Fixed state is transited to the Init state again, and the ID starting position is detected from the first frame.

Next, a Hold state stops a detecting process, and transmits an ID signal corresponding to the detected ID starting position, that is, an ID signal generated from the Fixed state, to a microcomputer.

Figure 5:
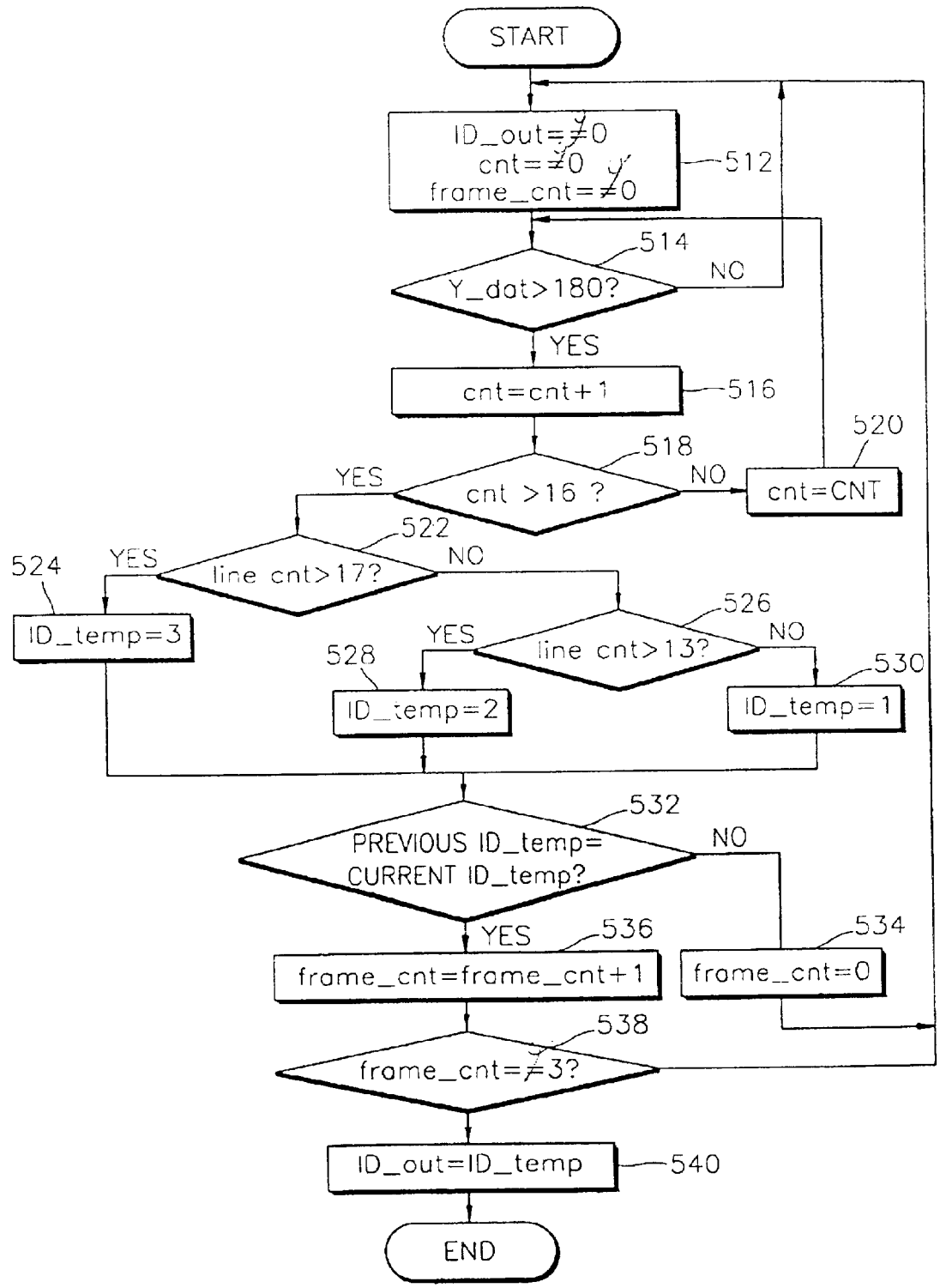
FIG. 5 is a flowchart detecting a starting position of an ID signal according to the present invention.

FIG. 5 is a flowchart illustrating the detection of the starting position of an ID signal according to the present invention.

First, a starting position value of an ID signal transmitted to a microcomputer (ID_out), a pixel counter (cnt) for counting the number of continuous pixels including an ID data, and a frame counter (frame_cnt) for counting the number of frames are initialized (step 512).

Next, a standard of judgement of a level value of a luminance signal is determined to be "180", and ID data is detected. Therefore, if the level value of a luminance signal (Y_dat) is greater than "180", the pixel counter (cnt) increases by "1". The count is repeated until the number of pixels becomes greater than "16" (steps 514, 516, 518, and 520). Alternatively, the standard of judgement of a level value of a luminance signal can be determined to be another value in addition to "180".

Next, if the pixel counter (cnt) becomes greater than "16", a microcomputer compares the line value counted by a line counter (line cnt) with "17," "13," and "11", which correspond to values of starting position lines (H) of an ID signal which is previously determined (step 522). Next, if the starting position line of an ID signal is determined by comparing the line value with the predetermined line value, the corresponding specific value (for example, "3," "2," "1") is stored in an ID memory (ID_temp) (steps 524, 526, 528, 530). For example, if the starting position line of an ID signal is greater than "17", "3" is stored in an ID memory (ID_temp).

Next, specific values stored in a previous ID memory (PREVIOUS ID_temp) and a current ID memory (CURRENT ID_temp) are compared (step 532). Here, if the specific values stored in the previous ID memory (PREVIOUS ID_temp) and the current ID memory (CURRENT ID_temp) are the same, the frame counter (frame_cnt) is increased by "1", and if they are determined to not be the same, the frame counter (frame_cnt) is determined to be "0", and initialized again (steps 534 and 536).

This loop is repeated until the frame counter (frame_cnt) becomes "3" in order to detect the starting position of an ID signal from three frames (step 538). A final ID memory (ID_temp) value is determined to be the starting position value (ID_out) of an ID signal transmitted to a microcomputer (step 540). Here, the number of frames detecting the starting position of an ID signal can be determined to be equal to or greater than 3.

Figure 6:
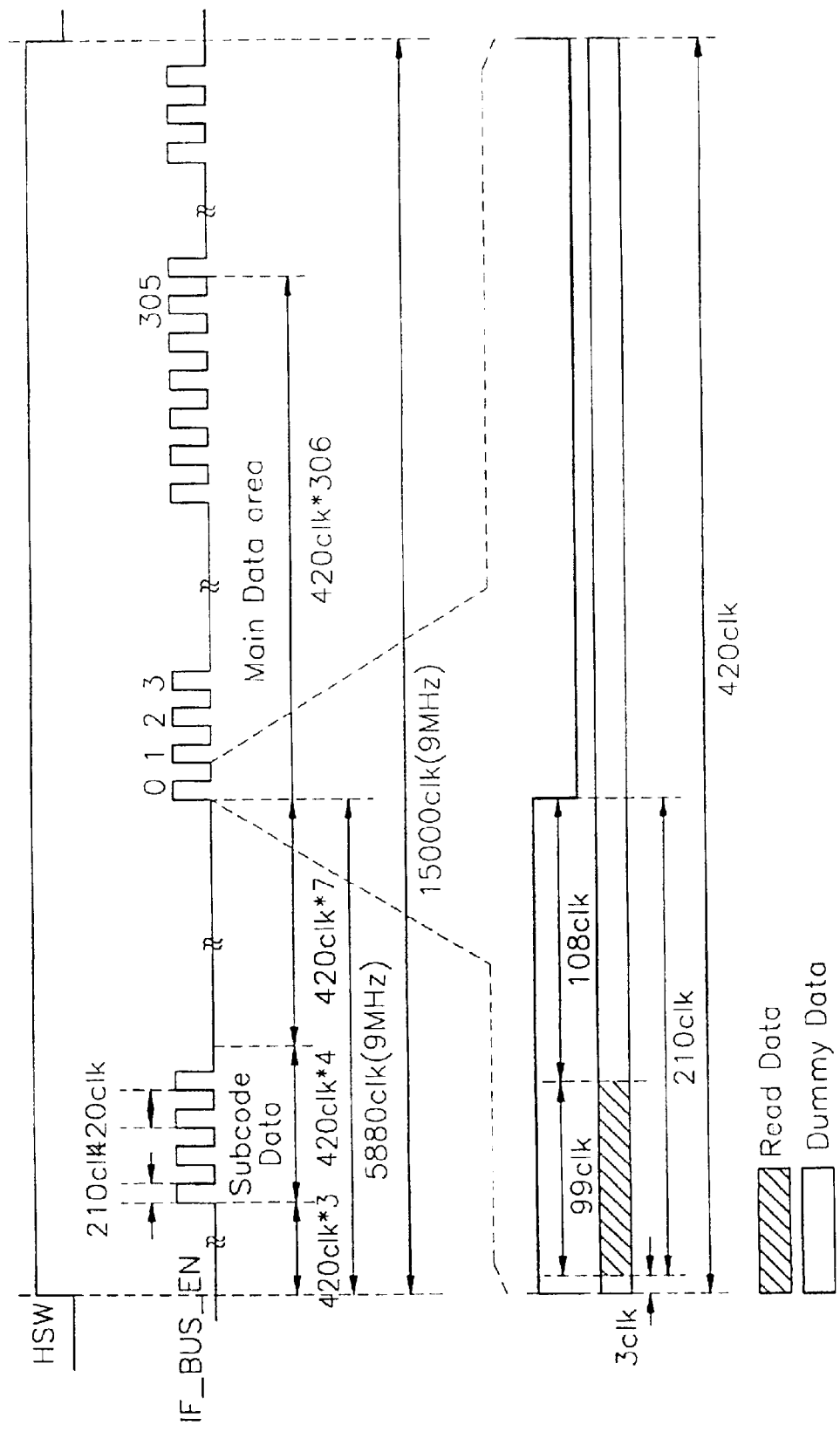
FIG. 6 illustrates a track format recorded on recording media.

FIG. 6 illustrates a track format recorded on recording media. Effective compression data (including an ID signal) is recorded in a main data area, and the starting position information of an ID signal is recorded in a subcode data area. A video signal included in the main data area is divided into read data and dummy data.

Figure 7:
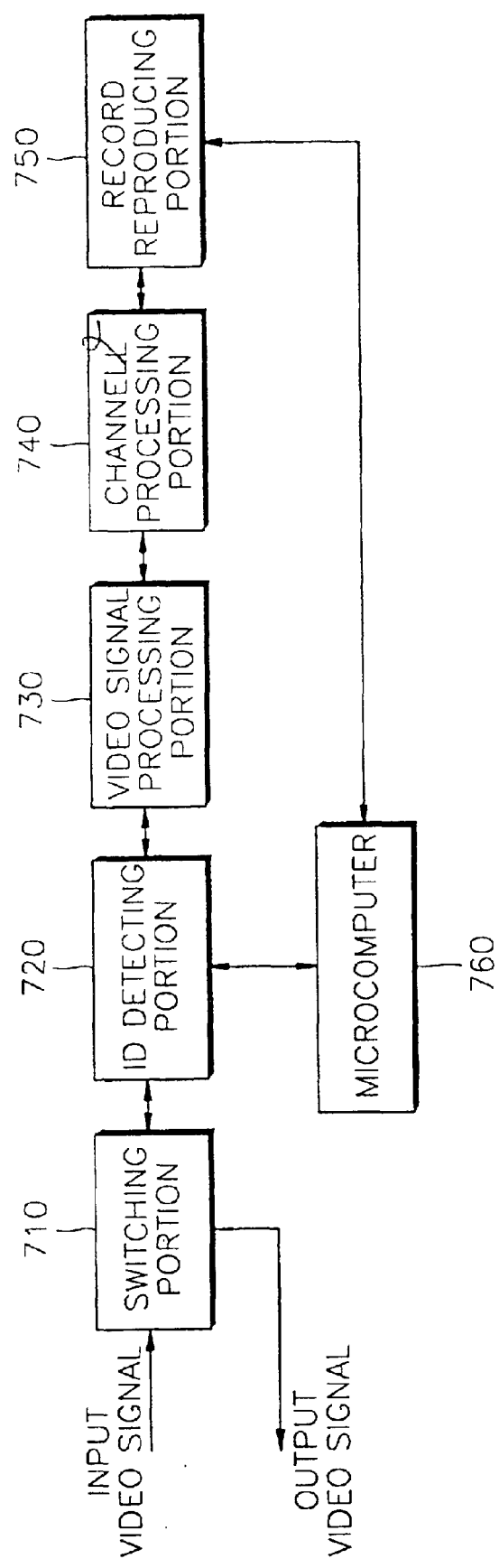
FIG. 7 is a block diagram showing an apparatus for processing a video-ID signal according to the present invention.

FIG. 7 is a block diagram showing an apparatus for processing a video-ID signal according to the present invention. This apparatus includes a switching portion 710, an ID detecting portion 720, a video signal processing portion 730, a channel processing portion 740, a record reproducing portion 750, and a microcomputer 760.

First, the operation of processing a video-ID signal during recording will be described.

After selecting a video signal input as a field and/or frame unit or a video signal according to the order of the camera, the switching portion 710 inserts an ID signal into a video signal. If an ID starting signal is input from the microcomputer 760 in order to detect an ID signal, the ID detecting portion 720 detects the starting position of the inserted ID signal, and applies the starting position of the detected ID signal to the microcomputer 760.

The video signal processing portion 730 detects the starting position of the ID signal detected by the ID detecting portion 720 as effective data, and performs compression.

The channel processing portion 740 adds an error-correcting code to a video signal compressed from the video signal processing portion 730, and outputs the modulated video signal.

The record reproducing portion 750 records the video signal modulated in the channel processing portion 740 in the form of a track in the recording media.

The microcomputer 760 applies the starting signal for detecting the ID signal to the ID detecting portion 720, and receives the starting position from the ID detecting portion 720 and records it in the subcode data area through the record reproducing portion 750.

Next, the operation of processing a video-ID signal during reproduction will be described.

The record reproducing portion 750 reproduces video data recorded in recording media, and the starting position of the ID signal recorded in the subcode data area to the microcomputer 760.

The channel processing portion 740 performs channel decoding using the error-correcting code added to the video data.

The microcomputer 760 receives the starting position of the ID signal from the record reproducing portion 750, and passes it to the ID detecting portion 720.

The video processing portion 730 inserts an ID signal into a position of a video signal originally input with reference to the starting position of an ID signal detected from the ID detecting portion 720, and decodes the video signal.

The ID detecting portion 720 receives the ID signal starting position from the microcomputer 760 and applies it to the video signal processing portion 730, and then, passes the decoded video signal from the video processing portion 730.

The switching portion 710 displays the video signal passed from the ID detecting portion 720 on a monitor.

Figure 8:
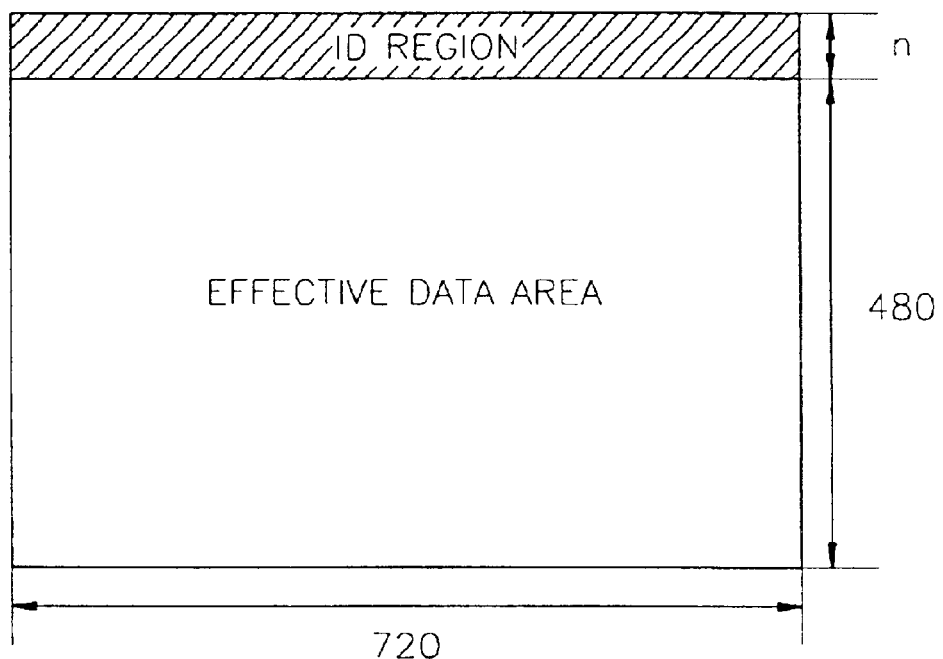
FIG. 8 illustrates an area of a video signal input to the switching portion of FIG. 7.

FIG. 8 illustrates a video signal input to the switching portion 710 of FIG. 7. An input video signal is formed of an effective data area (720×480) and an ID data area (720×n).

Figure 9:
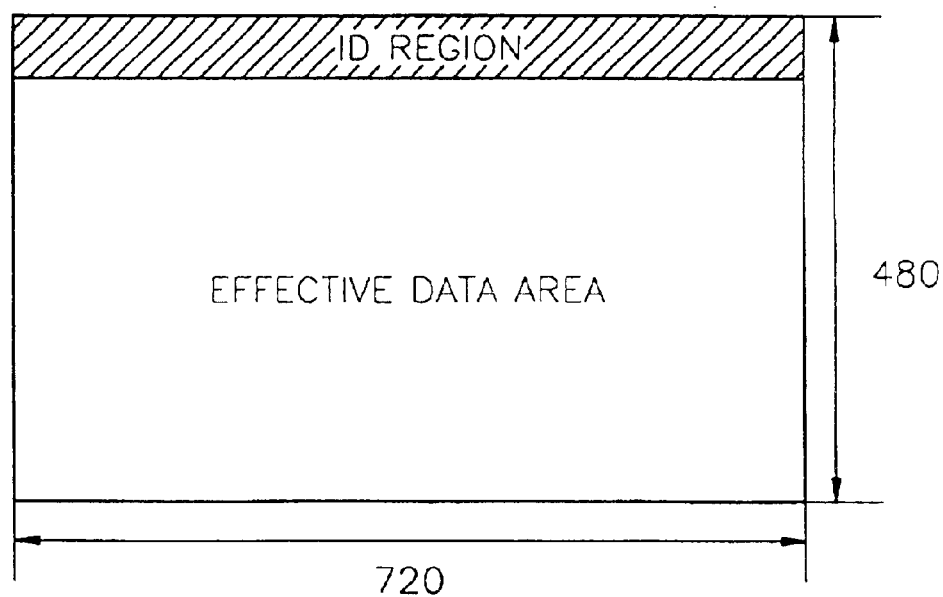
FIG. 9 illustrates an area of a video signal output to the switching portion of FIG. 7.

FIG. 9 illustrates a video signal output to the switching portion 710 of FIG. 7. An output video signal is indicated as the effective data area (720×480) including an ID data. Therefore, if both the ID data area and the effective data area are encoded together, an output video signal is formed of the same areas as that of the input video signal (FIG. 8).

According to the present invention, a video-ID signal is recorded in a time-lapse video recording reproducing system, and the video-ID signal is identified with a video signal to be compressed and restored, so that compatibility of switching portions of systems sold on the market can be maintained.

What is claimed is:

1. A method for processing a video-ID signal in a recording and reproducing system, comprising the steps of:
   detecting the starting position of a video-ID signal from an input video signal, compressing a video signal started from the video-ID signal as a predetermined compression unit, and recording the starting position of the detected video-ID signal in a predetermined recording area; and
   detecting the starting position of the video-ID signal recorded in the predetermined recording area, and decoding a video signal which inserts the video-ID signal into the starting point.

2. The method of claim 1, wherein the step of detecting the starting position of the video-ID signal comprises the steps of:
   determining an input video signal to be the starting position of the video-ID signal if a luminance component of the input video signal is higher than a predetermined level;
   after detecting the starting position of the video signal in a present frame, comparing the starting position of the present frame with the starting position of a video-ID signal of a next frame, and if the starting positions are the same, determining the starting position to be the starting position of the video-ID signal.

3. The method of claim 2, wherein the step of detecting the starting position of the video-ID signal is performed repeatedly in at least one or more frames according to an external video signal.

4. The method of claim 2, wherein the starting position of the video-ID signal exists in a synchronous line in which a predetermined number of luminance components higher than a predetermined level are continued.

5. The method of claim 1, wherein the input video signal is formed of an effective video data area and a separate video-ID signal area.

6. The method of claim 1, wherein, in the reproduced video signal, the video-ID signal area is included in the effective video data area.

7. The method of claim 1, wherein the starting position of the video-ID signal is recorded in a subcode area of a digital track format.

8. An apparatus for recording a video-ID signal in a recording and reproducing system, the apparatus comprising:
   an ID position detector for detecting a starting position of a video-ID signal inserted at a predetermined interval in input video data;
   a video processor for compressing video data started from the detected starting position as a predetermined compression unit; and
   a controller for recording the detected starting position of the video-ID signal in a predetermined recording area of recording media.

9. An apparatus for reproducing a video-ID signal in a recording and reproducing system, the apparatus comprising:
   an ID position detector for detecting a starting position of a video-ID signal recorded in a predetermined recording area; and
   a video processor for decoding a video signal that inserts the video-ID signal into the detected starting position of the video-ID signal.

* * * * *